United States Patent
Shan et al.

(10) Patent No.: US 12,413,458 B2
(45) Date of Patent: Sep. 9, 2025

(54) FREQUENCY MODULATION IN A COMMUNICATIONS NETWORK

(71) Applicant: Hughes Network Systems, LLC, Germantown, MD (US)

(72) Inventors: Minheng Shan, Germantown, MD (US); Kumud Patel, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 145 days.

(21) Appl. No.: 18/496,166

(22) Filed: Oct. 27, 2023

(65) Prior Publication Data

US 2025/0141721 A1    May 1, 2025

(51) Int. Cl.
*H04L 25/49* (2006.01)
*H04B 1/40* (2015.01)

(52) U.S. Cl.
CPC ........... *H04L 25/4921* (2013.01); *H04B 1/40* (2013.01)

(58) Field of Classification Search
CPC .............................. H04L 25/4921; H04B 1/40
USPC .................. 375/262, 302, 306, 308
See application file for complete search history.

(56) References Cited

U.S. PATENT DOCUMENTS

| | | | | |
|---|---|---|---|---|
| 5,442,655 | A * | 8/1995 | Dedic | H04L 25/06 375/349 |
| 5,903,823 | A * | 5/1999 | Moriyama | H03F 1/3241 330/149 |
| 6,038,267 | A * | 3/2000 | Oura | H04L 27/2332 329/304 |
| 2010/0207819 | A1* | 8/2010 | Uhl | H01Q 3/2605 342/372 |

OTHER PUBLICATIONS

Nash, Eamon; "Correcting Imperfections in IQ Modulators to Improve RF Signal Fidelity"; Analog Devices; www.analog.com; 2009; pp. 1-8.
Baldwin, Jesse G. and Dubbert, Dale F.; "Quadrature Mixer LO Leakage Suppression Through Quadrature DC Bias"; Sandia National Laboratories; SAND2002-1316; printed May 2002 (47 pages).
Frizelle, Dave; "Transmit LO Leakage (LOL)—An Issue of Zero—IF That Isn't Making People Laugh Out Loud"; Analog Dialogue 51-07, Jul. 2017, analogdialogue.com; pp. 1-5.

* cited by examiner

*Primary Examiner* — Emmanuel Bayard
(74) *Attorney, Agent, or Firm* — Brooks Kushman P.C.

(57) ABSTRACT

A processor can be configured to execute instructions stored in the memory to position a first point in a grid space that represents an unmodulated signal component of a first signal based on a characteristic of a frequency modulator generating the first signal. The frequency modulator can include a first input to receive data from a baseband source and can include a second input to receive a second signal from a local oscillator. The processor can determine, in the grid space, a first angle between a first line segment from a reference point to the first point and a second line segment from the first point to a point representing the first offset signal applied to the frequency modulator. The processor can additionally apply a second offset signal, based on the first angle, to compensate for the characteristic of the frequency modulator.

20 Claims, 8 Drawing Sheets

FREQUENCY MODULATION IN A COMMUNICATIONS NETWORK

BACKGROUND

In a communications network that utilizes wireless communication links between transmitting and receiving stations, a local oscillator may be used to convert a signal from a baseband source (e.g., digitized voice, data, multimedia content, etc.) to a signal that can be transmitted by an antenna. In some communication systems, modulation techniques may be utilized to simultaneously transmit two or more signals utilizing an allocated portion of a frequency spectrum. For example, in an in-phase and quadrature-phase (I/Q) communication system, a first signal from a baseband source can be modulated in quadrature (e.g., 90-degrees out of phase) in relation to a second signal from the baseband source. Such systems can operate with increased spectral efficiency, noise resistance, etc.

DETAILED DESCRIPTION

Figure 1:
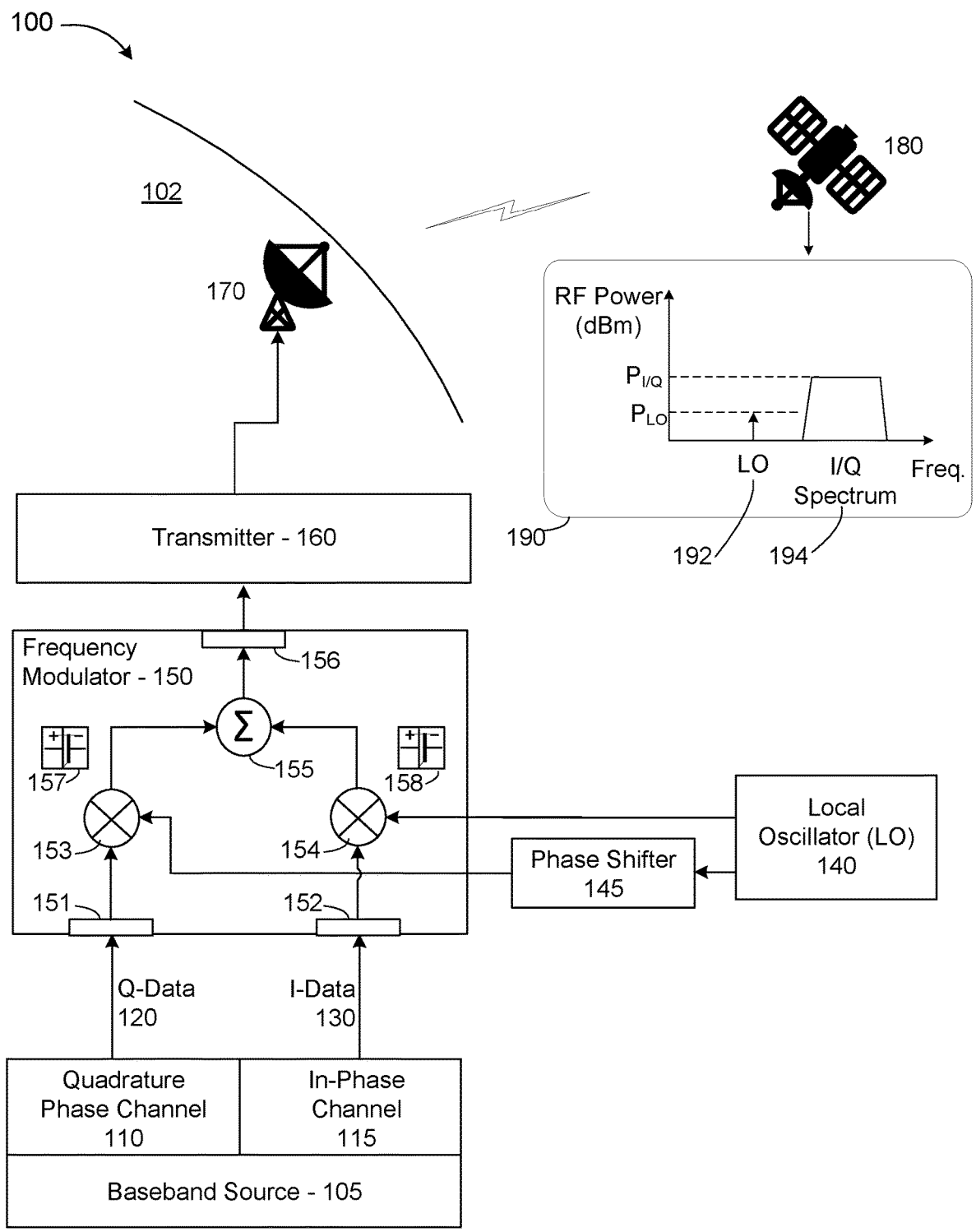
FIG. 1 is a diagram of an example communications network that utilizes satellites arranged in a low Earth orbit.

In the context of this disclosure, an in-phase and quadrature-phase communication system means a wireless communication system in which an allocated portion of a frequency spectrum is utilized to convey a first signal from a baseband source that is modulated in quadrature (i.e., 90-degrees out of phase) in relation to a second signal from a baseband source. In an example, a signal from a baseband source can be divided into first and second data streams. In such an example, a first data stream can be frequency modulated in quadrature in relation to the second data stream. To perform such modulation, signals from a local oscillator may be divided into a first local oscillator signal that undergoes a quadrature-phase (e.g., 90 degrees) shift in relation to a second local oscillator signal prior to coupling the first local oscillator signal to the frequency modulator. The second signal from the local oscillator can be directly coupled to the frequency modulator. In this context, a "local oscillator" means an electronic circuit that generates a periodic, oscillating or alternating current (AC) signal that can be modulated (e.g., multiplied by, added to, etc.) by a first (e.g., quadrature-phase) and a second a (e.g., in-phase) data stream. In this context, the term "modulation" means modifying a signal from a local oscillator to introduce information into the signal from the local oscillator. Such information may include digitized voice(s), text message content, multimedia content, etc. To introduce information into a signal from a local oscillator, a modulator may adjust the amplitude, phase, frequency, or any other suitable attribute of a signal generated by the local oscillator, to convey information included in a data stream.

A baseband source may encode information by generating a signal that varies over time. Accordingly, a baseband source can transmit a data stream that includes binary 1's and binary 0's by adjusting a voltage transition, for example, between −1 volt relative to a reference (e.g., to represent a binary 0) and +1 volt relative to the reference (e.g., to represent a binary 1). Accordingly, to execute frequency modulation of a signal from a local oscillator utilizing a baseband source, the modulated signal may include a first frequency that represents a −1-volt signal at an input port of the modulator and a second frequency that represents a +1-volt signal at the input port of the modulator.

However, in a frequency modulator, it may be difficult to isolate a local oscillator, signal coupled to an input port of the frequency modulator, from the signal present at an output port of the frequency modulator. Accordingly, in one example, a modulator that generates a first frequency representing a −1-volt signal and generates a second frequency representing a +1-volt signal may generate a third frequency that represents an unmodulated signal from the local oscillator. Such introduction of a local oscillator signal at an output of a frequency modulator may represent an in-band noise source of the frequency modulated signal to be transmitted to a receiver. Further, since the local oscillator signal is unmodulated, the signal does not include information introduced by the baseband source. Accordingly, transmitting the unmodulated local oscillator signal can be an inefficient use of an allocated frequency spectrum and signal transmission resources.

In accordance with examples described herein, a frequency modulator can be calibrated to reduce the coupling of an unmodulated local oscillator signal to the output signal port of the frequency modulator. In an example, coupling of an unmodulated local signal input with the output signal port can be reduced to a threshold level, such as 60 decibels, 70 decibels, 80 decibels, etc., below the signal level of the modulated signal. In an example, such a reduction in the coupling of a local oscillator signal to an output port of a frequency modulator can be achieved by applying an offset signal at a local oscillator input port of the frequency modulator. In this context, an "offset signal" means a calibration signal having a constant amplitude (e.g., a direct-current bias voltage) or a time-varying amplitude (e.g., sinusoidal voltage, a time-varying or time-stepped direct-current bias voltage) that is applied to one or more local oscillator input ports of the frequency modulator. An offset signal can be applied to an input port of a frequency modulator that is coupled (i.e., without direct electrical connection) to a local oscillator input to the frequency modulator. In an example, for a frequency modulator that generates quadrature-phase and in-phase modulated signals, an offset signal can be applied to a quadrature-phase input to the frequency modulator that is different from an offset signal applied to an in-phase input to the frequency modulator. As a result of the application of offset signals, a frequency modulator can be calibrated to reduce, e.g., to a threshold level, the unmodulated local oscillator signal in relation to the quadrature-phase and in-phase modulated signals at the output signal port of the modulator.

In an example, calibration of a frequency modulator can be achieved utilizing a grid space allocated in a memory array by executing computer instructions. In this context a "grid space" means a two-dimensional coordinate frame in which individual points within the coordinate frame can be uniquely defined utilizing a first descriptor, to indicate a distance from an arbitrary center point of a geometric figure (e.g., circle) in a first direction (e.g., along a horizontal axis) of the geometric figure, and utilizing a second descriptor, to indicate a distance from the arbitrary center point in a second direction (e.g., along a vertical axis) of the geometric figure. The grid space can include a modulated signal plane, which may be utilized to represent a quadrature-phase signal and an in-phase signal as a modulation vector that is directed radially from the origin of the modulated signal plane. The modulation vector may terminate at a point on a circumferential edge of a unit circle that surrounds the origin. The grid space can additionally include a local oscillator signal plane, which may be utilized to represent an unmodulated local oscillator signal coupled from a local oscillator input port of a frequency modulator to an output port of the frequency modulator. In an example, a computer may be programmed to position a point on the local oscillator signal plane of the grid space that represents a level of the unmodulated signal from the local oscillator, with respect to the quadrature-phase and in-phase modulated signals, which has been coupled into the output port of the frequency modulator.

In an example, a local oscillator signal plane of a grid space can be overlaid on a modulated signal plane of the grid space. A first axis of the local oscillator signal plane can represent a power level of an unmodulated local oscillator signal referenced to the level of a quadrature-phase modulated signal represented on the modulated signal plane of the grid space. A second axis of the local oscillator signal plane can represent a level of unmodulated signal present with respect to the level of an in-phase transmitted signal represented on the modulated signal plane. In such an example, although the location of the point in the local oscillator signal plane may be initially unknown, the computer may execute instructions to iteratively narrow regions of the local oscillator signal plane that encompass the point representing the unmodulated signal. In an example, to refine or focus the region of the local oscillator signal plane that encompasses the point representing the level of an unmodulated signal with respect to the in-phase and quadrature-phase modulated signal, a computer may execute instructions to apply an offset signal (e.g., an offset voltage) to local oscillator signal input ports of the frequency modulator. Points representing a level of unmodulated signal present with respect to the in-phase and quadrature-phase signals resulting from the offset signals (e.g., offset voltages) can be positioned in the grid space. Computer instructions can then be executed to determine geometric relationships (e.g., sines and cosines) among line segments generated in the local oscillator signal plane that extend between the values of offset signal voltages and the estimated point.

In an example, determining the location of the estimated point in the local oscillator signal plane of a grid space may include an iterative process, in which a result of a first iteration can be utilized as an initial point of origin in the grid space for a second iteration. After a small number (e.g., 2, 3, 4, 5) of iterations, an offset signal (e.g., an offset voltage) can be determined that reduces, e.g., to below a threshold level, coupling of the unmodulated local oscillator signal into the modulated output signal of the frequency modulator. In response to the reduction of an unmodulated signal at an output port of a frequency modulator, the modulator can operate with increased spectral efficiency and with decreased in-band interference from the unmodulated local oscillator signal. Such a process can be performed in place of existing processes, which may require hundreds, thousands, or an even greater number of iterations to determine offset signals that suitably reduce coupling of the local oscillator signal into the output signal of the frequency modulator.

In an example, a system can include a processor and a memory coupled to the receiver, in which the processor is configured to execute instructions stored in the memory to position a first estimated point in a grid space that represents an unmodulated signal component of a first signal based on a characteristic of a frequency modulator generating the first signal. The frequency modulator can include a first input to receive data from a baseband data source and can include a second input to receive a second signal from a local oscillator. The instructions can additionally be to apply a first offset signal to the frequency modulator and to determine, in the grid space, a first angle between a first line segment from a reference point to the first point and a second line segment from the first point to a point representing the first offset signal applied to the frequency modulator. The instructions can additionally be to apply a second offset signal, based on the first angle, to compensate for the characteristic of the frequency modulator.

In an example the characteristic of the frequency modulator can represent a direct-current (DC) bias of the frequency modulator.

In an example, the system can additionally include a quadrature-phase shifter coupled to a first output port of the local oscillator to convert a signal from the first output port to a quadrature-phase signal.

In an example, the local oscillator can include a second in-phase output signal port.

In an example, the instructions can additionally be to generate a local oscillator signal plane overlaid on the grid space prior to locating the first point in the grid space, wherein the local oscillator signal plane includes a locus of points that represent possible values of in-phase and quadrature-phase contributions to the unmodulated signal component by the frequency modulator.

In an example, the system can additionally include a first DC bias coupled to a quadrature-phase input port of the frequency modulator.

In an example, the system can additionally include a second DC bias coupled to an in-phase input port of the frequency modulator.

In an example, the baseband source can include a first baseband data source for in-phase modulation and a second baseband data source for quadrature-phase modulation.

In an example, the instructions can additionally be to determine a relationship between the unmodulated signal component and a second component representing the baseband source.

In an example, the instructions can additionally be to apply the second offset signal to the frequency modulator and to determine a second angle between a third point representing the second offset signal applied to the frequency modulator and a fourth line segment from the third point to a fourth point representing a third offset signal applied to the frequency modulator.

In an example, a method can include modulating a first signal from a baseband source, using a second signal from a local oscillator, to form a third signal. The method can include receiving the third signal and representing an unmodulated signal component of the third signal using a first point in a grid space generated in a computer memory, the unmodulated signal component being based on the second signal. The method can additionally include applying a first offset signal to the frequency modulator and determining, in the grid space, a first angle between a first line segment from a reference point to the first point and a second line segment from the first point to a point representing the first offset signal applied to the frequency modulator. In an example, the method can additionally include applying a second offset signal to the frequency modulator to reduce the unmodulated signal component based on the first angle.

In an example, the first offset signal can be a DC bias signal.

In an example, modulating the first signal from the baseband source can include dividing the first signal into a first data stream for in-phase modulation and a second data stream for quadrature-phase modulation.

In an example, the method can additionally include shifting a portion of the second signal into a quadrature-phase signal.

In an example, the method can additionally include generating a local oscillator signal plane overlaid on the grid space prior to locating the first point in the grid space, wherein the local oscillator signal plane includes a locus of points that represent possible values of in-phase and quadrature-phase contributions to the unmodulated signal component by the frequency modulator.

In an example, the method can additionally include determining a relationship between the unmodulated signal component and a second component representing the baseband source.

In an example, determining the relationship between the unmodulated signal component and the second component can include determining a ratio between a signal level of the unmodulated signal component and a signal level of the second component.

In an example, the unmodulated signal component represents a DC bias applied to the frequency modulator.

In an example, the method can include determining a quadrant in the grid space, the quadrant being based on the second offset signal applied to the frequency modulator that reduces the unmodulated signal component.

In an example, in response to applying the second offset signal to the local oscillator, the method can additionally include determining a second angle between a third point representing the second offset signal applied to the frequency modulator and a fourth line segment from the third point to a fourth point representing a third offset signal applied to the frequency modulator.

FIG. 1 is a diagram of example communications network 100 that utilizes satellites arranged in a low Earth orbit. As indicated in FIG. 1, satellite 180 orbits the Earth 102 within the communications range of ground station antenna 170. Satellite 180 can be positioned in a geosynchronous orbit that permits ground station antenna 170 to be continuously oriented in the direction of satellite 180. In another example, satellite 180 may move relative to the surface of the earth 102 such as at a distance of between 300 kilometers and 1200 kilometers above the surface of the earth 102. In such an example, antenna 170 may represent an electronically scanned antenna having a main beam that is continuously or intermittently reoriented in the direction of satellite 180, so as to maintain a wireless communications link between antenna 170 and satellite 180. Antenna 170 may be of any suitable type, such as a parabolically-shaped antenna, or a two-dimensional phased array antenna that electronically scans an antenna beam in the direction of satellite 180.

In the example communications network of FIG. 1, antenna 170 may exchange wireless signals utilizing quadrature-phase and in-phase communication signals. In operations to transmit signals from antenna 170 to satellite 180, baseband source 105 may generate binary digits that represent voice, text message content, multimedia content, or any other type of information. Baseband source 105 may divide baseband data into Q-data 120, which means data to be transmitted utilizing quadrature-phase modulation (i.e., undergoing quadrature phase shifting during modulation), and I-data 130, which means data to be transmitted utilizing in-phase modulation (i.e., without undergoing phase shifting during modulation). Quadrature-phase channel 110 and in-phase channel 115 may operate at any suitable data rate, such as 10 megabits per second, 20 megabits per second, 50 megabits per second, etc.

Frequency modulator 150 can include first input port 151 and second input port 152. First input port 151 can accept Q-data 120 from quadrature-phase channel 110, which may be mixed, via mixer 153, with a phase-shifted version of a signal from an output port of local oscillator 140. Phase shifter 145 can include a quadrature-phase shifter, in which a first input signal from local oscillator 140 can be shifted by approximately 90 degrees to form a signal that is in phase quadrature with a second input signal from local oscillator 140. Second input port 152 can accept I-data 130 from in-phase channel 115, which may be mixed, via mixer 154, with a signal from an output port of local oscillator 140. Frequency modulator 150 can additionally include combiner 155, which operates to combine output signals from mixer 153 and 154 into a composite output signal for coupling to an input port of transmitter 160 via output port 156. A composite (i.e., a quadrature-phase modulated and an in-phase modulated) signal can be coupled to transmitter 160 and to antenna 170 for transmission to satellite 180.

Frequency modulator 150 can additionally include bias voltages 157 and 158. The values of bias voltages 157 and 158 can represent unknown voltages that are characteristics of frequency modulator 150. In this context, a "characteristic" of a frequency modulator means an inherent or intrinsic property of a frequency modulator resulting from the electronics architecture of the modulator, the circuit elements selected for use in the modulator, the materials used in construction of the modulator, and/or the interactions between the selected circuit elements, which result in an internal voltage bias as modeled by bias voltages 157 and 158. In an example, characteristic bias voltages 157 and 158 can result from a tolerance buildup of electrical components of frequency modulator 150, uncharacterized internal resistances and/or parasitic capacitances between electrical components, mismatches among internal radiofrequency components, etc. An effect of characteristic bias voltages 157 and 158 can be to couple unmodulated signals from local oscillator 140 to both quadrature-phase and in-phase signals available at output port 156. Accordingly, as a result of characteristic bias voltages 157 and 158, which are internal to modulator 150, unmodulated signals from local oscillator 140 can be coupled to transmitter 160 for amplification and transmission to satellite 180 via antenna 170.

The example of FIG. 1 additionally shows an RF power versus frequency profile (profile 190), which represents a profile of a signal from antenna 170 received at satellite 180. The horizontal axis of profile 190 indicates frequency, and the vertical axis of profile 190 indicates received RF power in decibels relative to milliwatt (dBm). The I/Q spectrum of profile 190 can indicate the portion of the allocated frequency spectrum that is consumed by the quadrature-phase and in-phase signals modulated by frequency modulator 150. In the example of FIG. 1, I/Q spectrum component 194 can indicate the portion of the frequency spectrum that includes the information generated by baseband source 105 and modulated by frequency modulator 150. At satellite 180, the power level of received I/Q spectrum component 194 can be indicated in profile 190 as having a power level $P_{I/Q}$. The example of FIG. 1 also indicates the power level of unmodulated local oscillator signal component 192, which is indicated as including a power level of $P_{LO}$.

It will be appreciated that the power level ($P_{LO}$) of unmodulated local oscillator signal component 192 can be significant (or at least non-negligible) with respect to the power level ($P_{I/Q}$) of I/Q spectrum component 194. It will additionally be appreciated that the frequency of unmodulated local oscillator signal component 192 can be located near the I/Q spectrum, which includes the information generated by baseband source 105 and modulated by frequency modulator 150. Thus, filtering of unmodulated local oscillator signal component 192 may involve use of a narrowband notch filter so as to reduce an interference contribution of the unmodulated local oscillator signal with the information included in the I/Q spectrum. However, such narrowband notch filters can introduce losses within the portion of the frequency spectrum utilized by I/Q spectrum component 194. Further, use of narrowband filtering can add complexity to electronic and signal processing resources of satellite 180.

Alternatively, as described in relation to FIGS. 3A-7, a calibration process can be applied to frequency modulator 150, which can reduce the power of unmodulated local oscillator signal component 192 to below a threshold level. In some instances, the power level of unmodulated local oscillator signal component 192 can be reduced to a level that is, for example, 60 decibels, 70 decibels, or even 80 decibels, below the power level of I/Q spectrum component indicated in profile 190.

Figure 2:
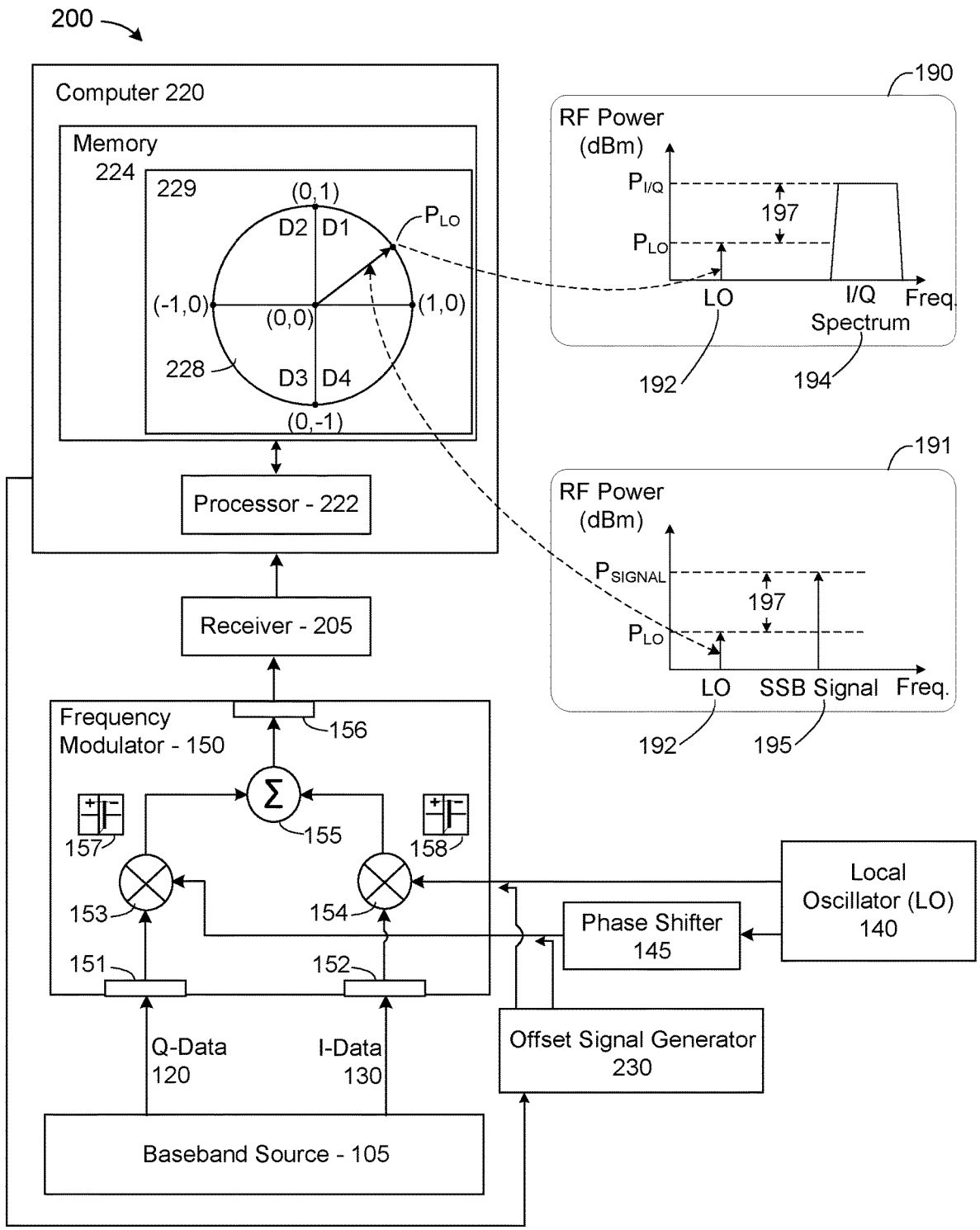
FIG. 2 is a diagram showing in-phase and quadrature-phase signal generation and a resulting frequency spectrum.

FIG. 2 is a diagram of a system 200 including in-phase and quadrature-phase signal generation and a resulting frequency spectrum. As shown in FIG. 2 (and as described in reference to FIG. 1), baseband source 105 can divide baseband data into Q-data 120, which is assigned to be transmitted utilizing quadrature-phase modulation, and I-data 130, which is assigned to be transmitted utilizing in-phase modulation. Q-data 120 and I-data 130 can be conveyed via first and second input ports 151/152 to frequency modulator 150. A first output signal from local oscillator 140 can be shifted in phase quadrature with respect to a second output signal from local oscillator 140. Mixer 153 can generate a quadrature-phase modulated signal in response to an input signal from local oscillator 140 via phase shifter 145. Mixer 154 can generate an in-phase modulated signal in response to an input signal coupled directly from local oscillator 140. Mixers 153 and 154 can generate quadrature-phase (Q) and in-phase (I) signal components, respectively, which can be summed via combiner 155 and output to receiver 205 via output port 156. Characteristic bias voltages 157 and 158, which can operate to couple unmodulated signals from local oscillator 140 directly to output port 156, can be inherent characteristics of the frequency modulator 150.

Output signals from frequency modulator 150 can be sent to receiver 205. In an example, receiver 205 can be a receiver of a spectrum analyzer, which provides a graphical display of received radiofrequency power level on the vertical axis and signal frequency on the horizontal axis. Accordingly receiver 205 can be, for example, a Tektronix® RSA5000B real-time spectrum analyzer available from Tektronix, Inc., located at 14150 SW Karl Braun Drive, P.O. Box 500, Beaverton, Oregon, USA. A suitable spectrum analyzer can include a graphical display capable of depicting features of profile 190.

In the example of FIG. 2, receiver 205 can generate output signals representing the power level ($P_{LO}$) of unmodulated local oscillator signal component 192 and the power level ($P_{I/Q}$) of I/Q spectrum component 194. Output signals representing $P_{LO}$ and $P_{I/Q}$ can be sent to an input port of computer 220. Processor 222 of computer 220 can execute program instructions to place a representation of $P_{LO}$ on local oscillator signal plane 228 as point $P_{LO}$ within grid space 229. In this context, a "local oscillator signal plane" means a locus of points that represent possible values of in-phase and quadrature-phase contributions to the unmodulated local oscillator signal. In an example, the horizontal axis can be utilized to define points on a circle of local oscillator signal plane 228 that represent the in-phase contribution to point $P_{LO}$. The vertical axis of local oscillator signal plane 228 can represent the quadrature-phase contribution to point $P_{LO}$. Such designations are arbitrary, and, in another example, the vertical axis of local oscillator signal plane 228 can represent the in-phase contribution to $P_{LO}$, and the horizontal axis can represent the quadrature-phase contribution to $P_{LO}$.

Figure 3A:
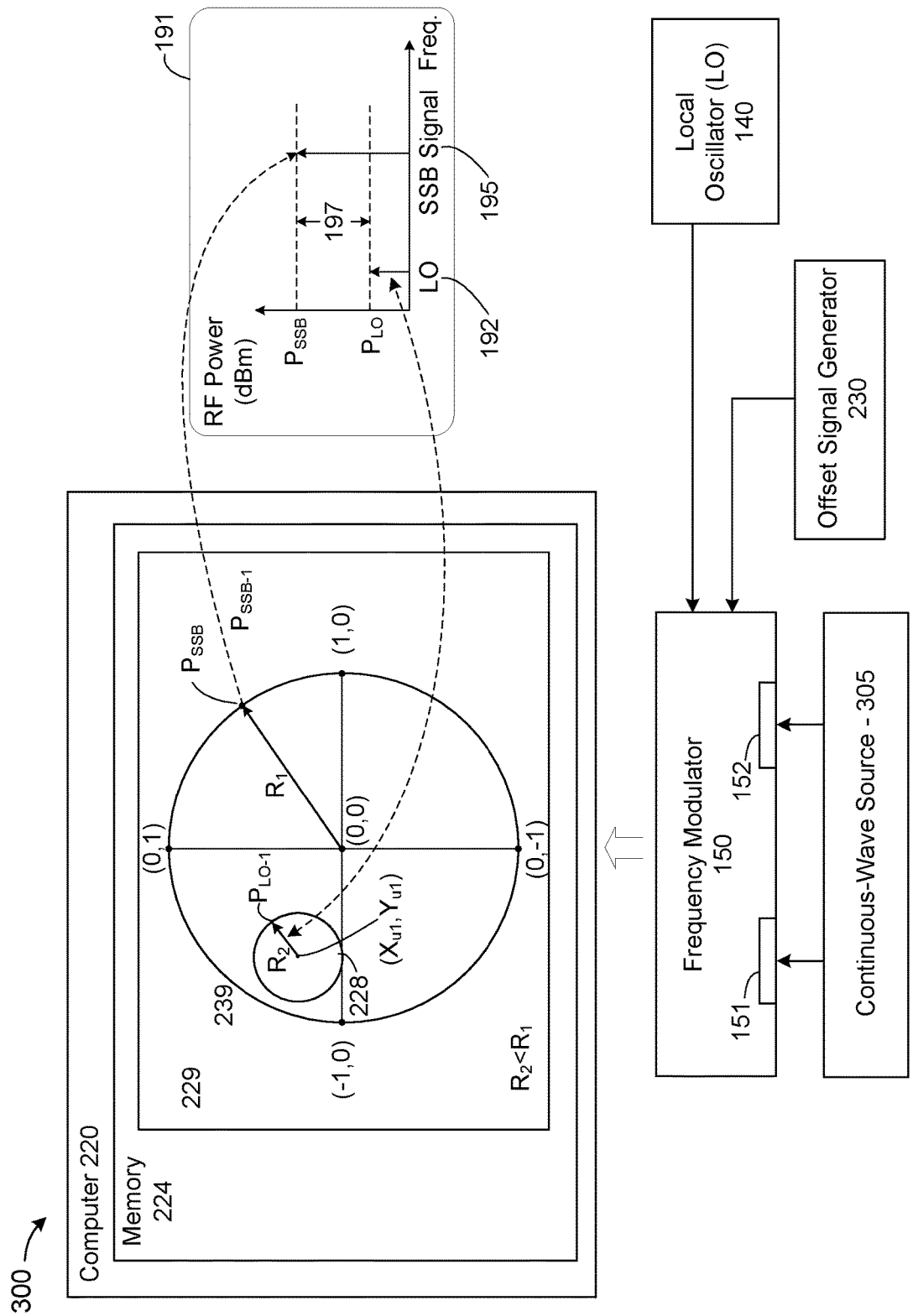
FIGS. 3A and 3B are diagrams showing an iterative procedure for reducing a contribution of a local oscillator signal in a communications network.

In the example of FIG. 2, and as shown and described in greater detail in reference to FIG. 3A, baseband source 105 can be substituted with a relatively stable continuous-wave source (305 in FIG. 3A). Accordingly, as shown via profile 191, a modulated signal generated in response to an input signal from continuous-wave source 305 to frequency modulator 150 can be represented by single-sideband (SSB) signal component 195 having an amplitude $P_{SIGNAL}$. As shown in FIG. 2, SSB signal component 195 can include an amplitude similar to an amplitude generated in response to baseband source 105. Thus, as shown in FIG. 2, I/Q spectrum component 194 of profile 190 and SSB signal component 195 of profile 191 are indicated as including comparable (or even equivalent) amplitudes based on characteristic bias voltages 157 and 158 generating voltage values that do not depend on whether baseband data or continuous-wave signals are coupled to the input ports of frequency modulator 150. In either instance, $P_{LO}$ remains at a similar level, as indicated by decibels below carrier (dBc) indicator 197 in profiles 190 and 191, below $P_{I/Q}$ (of profile 190) or $P_{SIGNAL}$ (of profile 191).

Local oscillator signal plane 228 can be divided into four quadrants, such as D1, D2, D3, and D4, although local oscillator signal plane 228 can be divided into another number of divisions, such as, two divisions, eight divisions, etc. The quadrants of local oscillator signal plane 228 can represent a measure of an amount that unknown negative or positive bias voltages (e.g., characteristic bias voltages 157 and 158) contribute to the power level of unmodulated local oscillator signal component 192 with respect to either I/Q spectrum component 194 or SSB signal component 195. Programming of computer 220 may execute to scale the size of local oscillator signal plane 228 in accordance with the power level of SSB signal component 195. In an example, a greater value of unmodulated local oscillator signal component 192 may result in computer 220 arranging a circle in local oscillator signal plane 228 having a relatively large radius while a lesser value of unmodulated local oscillator signal component 192 may result in computer 220 arranging the circle in local oscillator signal plane 228 having a relatively small radius.

It should be noted that the location of point $P_{LO}$ on local oscillator signal plane 228 is initially unknown. Thus, locating point $P_{LO}$ on a circle, for example, on local oscillator signal plane 228 represents an initial estimate of the power level of unmodulated local oscillator signal component 192. In an example, an initial estimate can be based on empirical evidence of the contributions of characteristic bias voltages 157 and 158 to the power level of unmodulated local oscillator signal component 192 with respect to I/Q spectrum component 194 based on past measurements of devices similar to frequency modulator 150. In an example, an initial estimate can be based on speculation or conjecture of the contributions of characteristic bias voltages 157 and 158 to the power level of unmodulated local oscillator signal component 192. In an example, placement of point $P_{LO}$ on the circle arranged in local oscillator can be based on a speculation that characteristic bias voltages 157 and 158 contribute in roughly equal proportions to the power level of unmodulated local oscillator signal component 192. In another example, placement of point $P_{LO}$ can be arbitrary. In the example of FIG. 2, point $P_{LO}$ is indicated as being the result of a nonzero (or non-negligible) quadrature-phase contribution from characteristic bias voltage 157 and a nonzero (or non-negligible) in-phase contribution from characteristic bias voltage 158.

In the example of FIG. 2 and as described further in reference to FIG. 3A, insertion of offset signals from offset signal generator 230 into mixers 153 and 154 can operate to compensate for characteristic bias voltages 157 and 158. Accordingly, in an example, based on the iterative process described in reference to FIGS. 3A-7 herein determining that characteristic bias voltage 157 includes a value of −0.37 volts, offset signal generator 230 can generate, for example, a signal of +0.37 volts so as to combine with characteristic bias voltage 157 and reduce the quadrature-phase contribution of characteristic bias voltage 157 to a zero or negligible value. In an example, such compensation can reduce the quadrature-phase contribution to the power level of unmodulated local oscillator signal component 192 to zero or other negligible value. In another example, in response to determining that the characteristic bias voltage 158 includes a value of −0.23 volts, offset signal generator can generate, for example, a signal of +0.23 volts so as to combine with characteristic bias voltage 158 and reduce the in-phase contribution of characteristic bias voltage 158 to a zero or negligible value. In an example, offset signal generator 230 can generate any range of voltages, such as DC voltages in the range of between −5 volts and +5 volts and may be selectable to provide a controlled voltage to within 0.1 millivolt. Thus, in an example, during a first iteration, offset signal generator 230 may generate a voltage of 0.12 volts for coupling to first input port 151 and a voltage of 0.26 volts for coupling to second input port 152. During a second iteration, offset signal generator 230 may generate a voltage of 0.09 volts for coupling to first input port 151, and a voltage of 0.039 volts for coupling to second input port 152.

In an example, an iterative process, such as described in reference to FIGS. 3A-7 herein, can utilize an approximation technique to determine contributions of characteristic bias voltages 157 and 158 to $P_{LO}$. In an example, computer 220 may execute the Newton-Raphson method to iteratively approximate characteristic bias voltages 157 and 158. In another example, computer 220 may execute another iterative approximation technique, such as a secant method, a bisection method, etc. The iterative approximation technique may compute a slope derived from two or more previous measurements of an unmodulated local oscillator signal component. A computed slope may then be utilized to predict contributions of characteristic bias voltages 157 at 158 to $P_{LO}$ in a subsequent measurement.

In an example, offset signal generator 230 can couple generated signals directly onto a wire or coaxial cable between local oscillator 140 and frequency modulator 150. In another example, offset signal generator can couple generated signals to separate input ports positioned nearby quadrature-phase and in-phase signal input ports of frequency modulator 150. Offset signal generator 230 can include a diode or a reactive circuit element (e.g., capacitors, inductors, or combinations thereof) so as to reduce coupling of signals from local oscillator 140 into offset signal generator 230. In an example, offset signal generator 230 may generate a time-stepped voltage, such as a voltage that varies, over time, among two or more voltage levels.

In the example of FIG. 2, programming of computer 220 may execute to position points similar to $P_{LO}$ at other locations of around local oscillator signal plane 228 based on offset signals generated by offset signal generator 230. For example, as shown in FIG. 2 and as described further in reference to FIG. 3A, points similar to $P_{LO}$ can be positioned at or between any cardinal points of local oscillator signal plane 228 (e.g., (1, 0), (0, 1), (−1, 0), and (0, −1) in response to offset signal generator 230 generating an offset signal (e.g., positive or negative voltages). For each combination of a positive or negative offset signal voltage applied to one of mixers 153/154 and a zero or negligible voltage the remaining one of mixers 153/154, a level of a resulting unmodulated local oscillator signal component (e.g., similar to 192) can be determined via programming of computer 220.

FIG. 3A is a diagram 300 showing a first iteration of an iterative procedure for reducing a contribution of a local oscillator signal in a communications network. In FIG. 3A, local oscillator signal plane 228 (of FIG. 2) has been overlaid and placed within modulated signal plane 239. Local oscillator signal plane 228 and modulated signal plane 239 are positioned within grid space 229 arranged within memory 224 of computer 220. With respect to modulated signal plane 239, $R_1$ represents a vector drawn from the origin (e.g., point (0, 0)) to a point $P_{SSB}$ of a first geometric figure (e.g., a circle) that represents a modulated signal from frequency modulator 150. Cardinal point (1, 0) of modulated signal plane 239 can represent the power level of a first modulated local oscillator signal component based on continuous-wave source 305 generating a first positive signal voltage applied to mixer 154 and based on a second value of zero or other negligible voltage applied to mixer 153. Cardinal point (0, 1) can represent a second modulated local oscillator signal level based on continuous-wave source 305 generating a zero or negligible voltage applied to mixer 154 and based on continuous-wave source 305 generating a second positive voltage applied to mixer 153. Cardinal point (−1, 0) can represent a third local modulated oscillator signal level based on continuous-wave source 305 generating to a third negative applied to mixer 154 and based on a value of zero or other negligible voltage applied to mixer 153. Cardinal point (0, −1) can represent a fourth local modulated oscillator signal level based on continuous-wave source 305 generating a zero or negligible voltage applied to mixer 154 and based on a negative voltage applied to mixer 153. Accordingly, in the example of FIG. 3A, programming of computer 220 can position cardinal points on modulated signal plane 239 based on quadrature-phase and in-phase signals generated by continuous-wave source 305. The magnitude ($R_1$) of the quadrature-phase and in-phase signals are summed and represented via profile 191 as SSB signal component 195.

In local oscillator signal plane 228 of FIG. 3A, $R_2$ represents a vector drawn from an unknown origin (e.g., point $X_{U1}$, $Y_{U1}$) to point $P_{LO-1}$ of a second geometric figure (e.g., a circle) arranged on a local oscillator signal plane that represents an unmodulated signal from frequency modulator 150. In an example, the magnitude of vector $R_1$ is scaled to accord with the level of a modulated signal output from frequency modulator 150. In an example, the magnitude of vector R2, which varies based on the magnitudes of characteristic bias voltages 157 and 158, is initially unknown but can be idealized and estimated via the iterative approximation process described herein. Accordingly, unknown point $P_{LO-1}$ on local oscillator signal plane 228, represents unmodulated local oscillator signal component 192 of FIG. 2. Point $P_{LO-1}$ is initially speculated as being in quadrant D2 of the local oscillator signal plane, although the initial placement of point $P_{LO-1}$ and the positioning of unknown origin $X_{U1}$, $Y_{U1}$ is simply an illustrative example. In an example, the magnitude of ($R_2$) of in relation to $R_1$, which represents a vector drawn from point (0, 0) to a point $P_{SSB}$, represented as unmodulated local oscillator signal component 192.

Figure 3B:
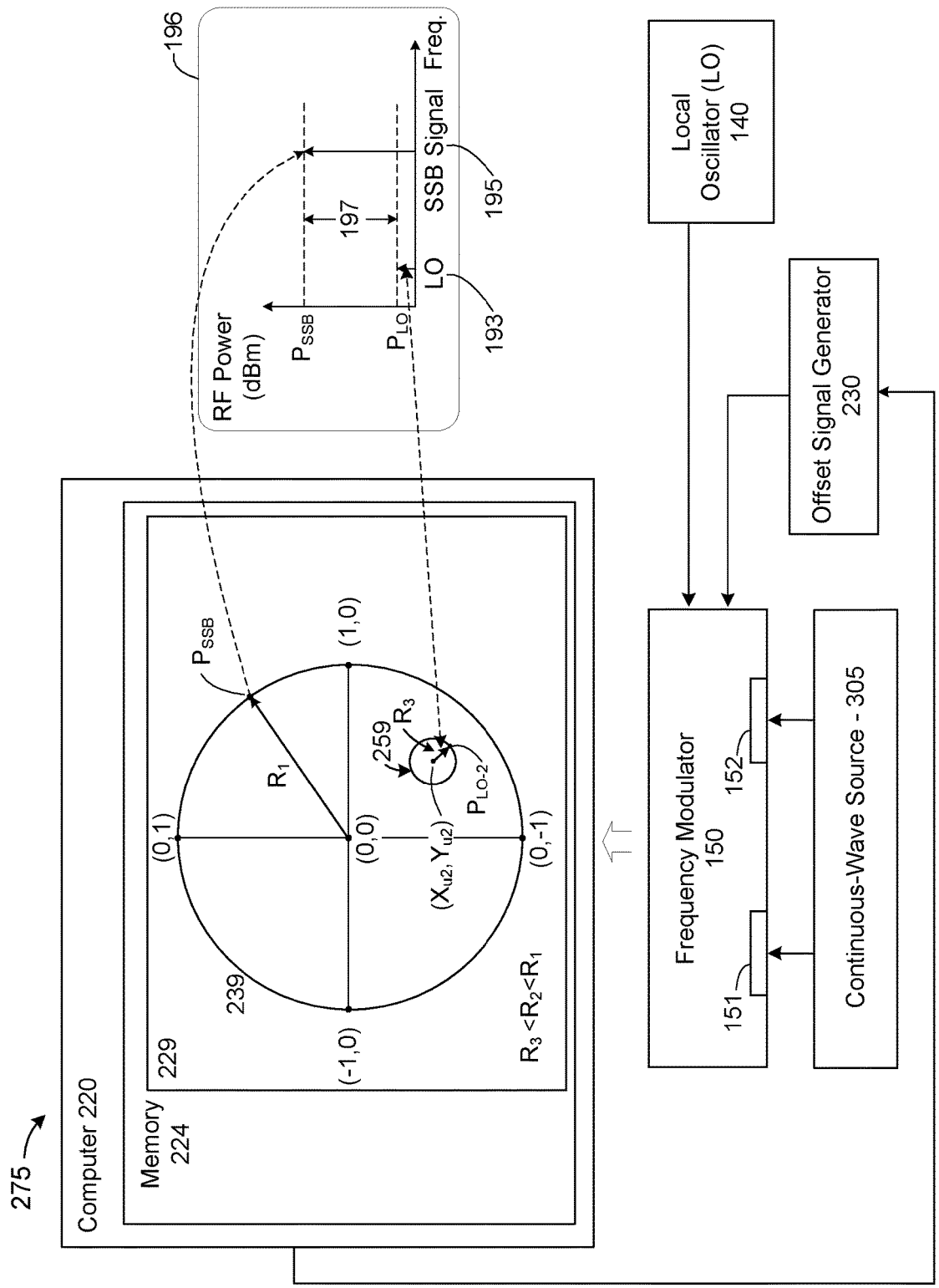

In an iterative procedure described in relation to FIGS. 4-7, computer 220 can direct offset signal generator 230 to generate voltages for input to frequency modulator 150. Generated offset voltages can operate to compensate for characteristic bias voltages 157 and 158 so as to reduce unmodulated local oscillator signal component 192. As shown in FIG. 3B, a second local oscillator signal plane (259 in FIG. 3B) can be overlaid on modulated signal plane 239. Based on a reduced level of unmodulated signal resulting from the first iteration, the second local oscillator signal plane (259) can include a circle having a magnitude ($R_3$) that represents a reduced level of signal from local oscillator 140 coupled from an input port of frequency modulator 150 to an output port of the frequency modulator.

FIG. 3B is a diagram 275 showing a second iteration of an iterative procedure for reducing a contribution of a local oscillator signal in a communications network. In the example of FIG. 3B, after a first iteration of an iterative procedure described in relation to FIGS. 4-7, a first approximation of an offset voltage can be coupled from offset signal generator 230 to frequency modulator 150. The first approximation of the offset voltage can operate to at least partially compensate for characteristic bias voltages 157 and 158, thereby reducing a level of unmodulated signal generated by frequency modulator 150. Accordingly, as shown in FIG. 3B, unmodulated local oscillator signal component 193 may be reduced in relation to unmodulated local oscillator signal component 192 of FIG. 3A.

In the example of FIG. 3B, continuous-wave source 305 can generate a modulated signal having an amplitude represented $P_{SSB}$. Similar to the first iteration described in relation to FIG. 3A, $R_1$ represents a vector drawn from the origin (e.g., point (0, 0)) of modulated signal plane 239 to a point $P_{SSB}$ that represents a modulated signal from frequency modulator 150. Based on offset voltage signals from offset signal generator 230, second local oscillator signal plane 259 can include a revised origin given by $X_{U2}$, $Y_{U2}$. In an example, $X_{U2}$ represents an offset voltage coupled from offset signal generator 230 that at least partially compensates for characteristic bias voltage 157. Similarly, $Y_{U2}$ represents an offset voltage coupled from offset signal generator 230 that at least partially compensates for characteristic bias voltage 158. Accordingly, responsive to the at least partial compensation of characteristic bias voltages 157/158, the level of unmodulated signal generated by frequency modulator 150 can be reduced in amplitude as represented by $R_3$, which is lesser in magnitude than $R_3$ described in relation to FIG. 3A.

Thus, it can be appreciated that an iterative procedure for reducing the contribution of an unmodulated local oscillator signal resulting from characteristic bias voltages 157/158 can compensate, with accuracy that increases in response to each iteration. With increasing accuracy, each iteration of voltages generated by offset signal generator 230 can approximate characteristic bias voltages 157/158, resulting in a successive reduction in radius $R_3$. In turn, the level of unmodulated local oscillator signal can be represented via, for example, profile 196, which shows a reduced level of local oscillator signal component 193 in relation to modulated SSB signal component 195. With each iteration, a value of a voltage offset coupled to mixer 153, which compensates for characteristic bias voltage 157, can be represented as an x-coordinate of a revised origin (e.g., $X_{U2}$). A value of a voltage offset coupled to mixer 154, which compensates for characteristic bias voltage 158, can be represented as a y-coordinate of a revised origin (e.g., $Y_{U2}$). In an implementation, in response to a small number of iterations (e.g., three iterations, four iterations, five iterations,) a contribution of an unmodulated local oscillator signal can be reduced to a level that is 60 decibels, 70 decibels, 80 decibels, etc., below SSB signal component 195. Accordingly, in such an implementation, decibels below carrier (dBc) indicator 197 can include successively larger values with each iteration.

Figure 4:
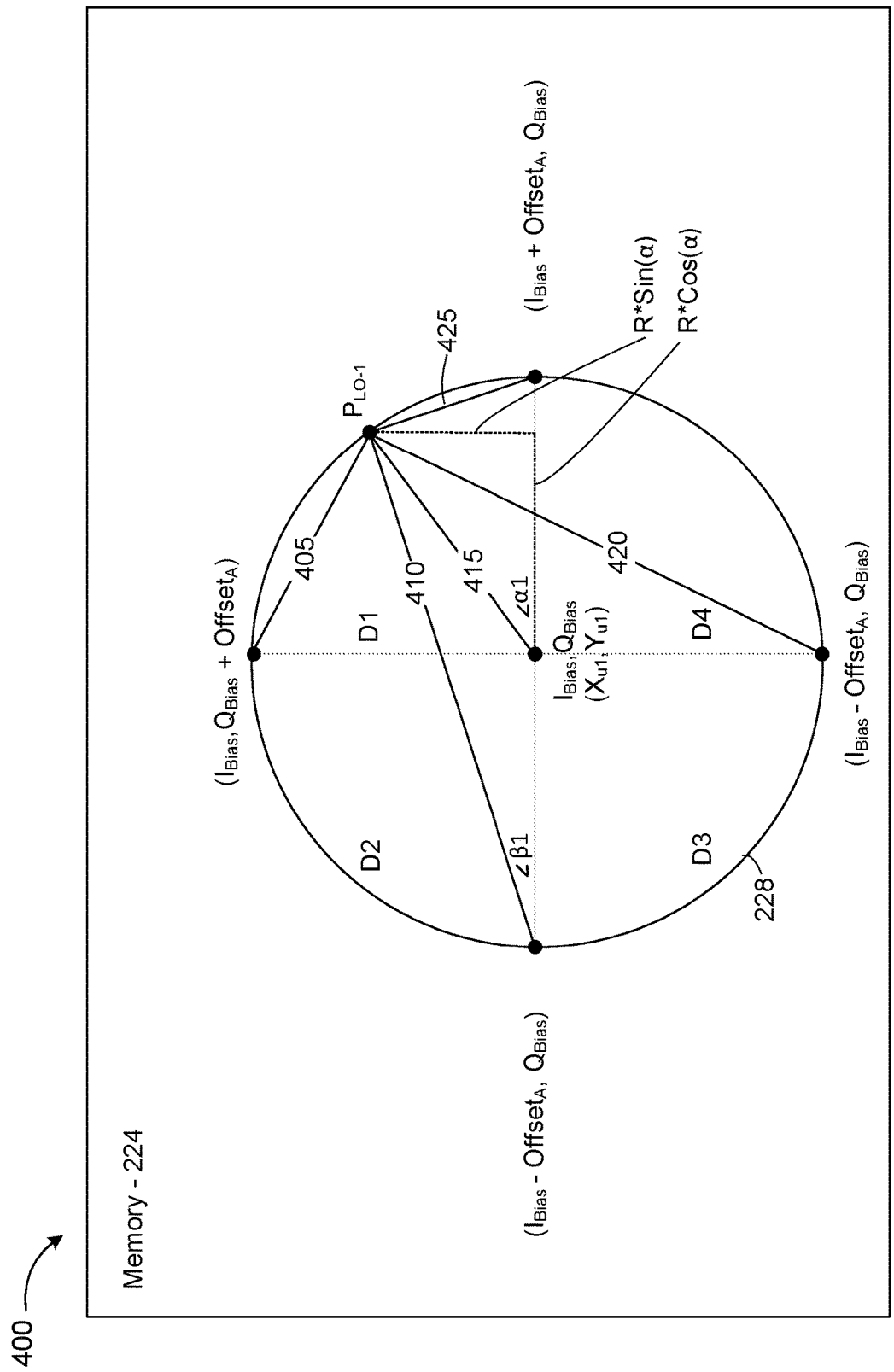
FIG. 4 is a diagram of points positioned in a local oscillator signal plane overlaid on a grid space of a computer memory.

FIG. 4 is a diagram 400 of points positioned in a local oscillator signal plane overlaid on a grid space of a computer memory. In FIG. 4, local oscillator signal plane 228 includes an origin given by $I_{Bias}$ and $Q_{Bias}$, which represents $X_{U1}$ and $Y_{U1}$ in FIG. 3A and FIG. 3B. Accordingly, $I_{Bias}$ represents a first approximation of characteristic bias voltage 158 and $Q_{Bias}$ represents approximation of characteristic bias voltage 157. In FIG. 4, line segment 415 represents the radius of local oscillator signal plane 228 having a length from a reference point (e.g., ($X_{U1}$, $Y_{U1}$)) to estimated unknown point $P_{LO-1}$, in which the length of line segment 415 can be scaled to represent the power level of unmodulated local oscillator signal component 192 relative to the power level of SSB signal component 195. Line segment 405 includes a length from cardinal point ($I_{Bias}$, $Q_{Bias}$+OffsetA) to estimated unknown point $P_{LO-1}$. Line segment 410 includes a length from cardinal point ($I_{Bias}$–OffsetA, $Q_{Bias}$) to estimated unknown point $P_{LO-1}$. Line segment 420 includes a length from cardinal point ($I_{Bias}$, QBias–OffsetA) to estimated unknown point $P_{LO-1}$. Line segment 425 includes a length from cardinal point ($I_{Bias}$+OffsetA, $Q_{Bias}$) to estimated unknown point $P_{LO-}$. Angle α1 can represent an angle between the horizontal axis of local oscillator signal plane 228 and line segment 415. Based on the geometrical properties of the circle arranged in local oscillator signal plane 228, in which line segment 410 represents a chord of local oscillator signal plane 228, angles β1 and α1 can be related by expression (1), below:

$$2*\beta1 = \alpha1 \qquad (1)$$

Accordingly, angle β1 can be determined via expression (2), below:

$$\angle\beta 1 = \arcsin\left(\frac{\text{Lowest}_{level}}{2*R(DC_{level})}\right) \quad (2)$$

where the quantity Lowest$_{level}$ represents the distance between a cardinal point (e.g., (I$_{Bias}$+OffsetA, Q$_{Bias}$), (I$_{Bias}$, Q$_{Bias}$+OffsetA), (I$_{Bias}$−OffsetA, Q$_{Bias}$) and (I$_{Bias}$, Q$_{Bias}$−OffsetA) of local oscillator signal plane 228 that provides the lowest level of unmodulated local oscillator signal component (e.g., 192) relative to SSB signal component 195 as determined via programming of computer 220. Thus, expressions (1) and (2) operate to determine, on local oscillator signal plane 228 of grid space 229, a first angle between a first line segment from a reference point (e.g., (I$_{Bias}$, Q$_{Bias}$)) to a first point (I$_{Bias}$+OffsetA, Q$_{Bias}$) and a second line segment from the point P$_{LO-1}$ to a point representing the first offset signal applied to the local oscillator. In this instance of a first iteration, the first offset signal can correspond to a voltage of I$_{Bias}$, Q$_{Bias}$.

In the example of FIG. 4, the quantity Lowest$_{level}$ is represented by line segment 425. The quantity 2*R(DC$_{level}$) represents twice the length of the radius of local oscillator signal plane 228. In the example of FIG. 4, R is represented by line segment 415, which includes a length from the reference point (I$_{Bias}$, Q$_{Bias}$) of local oscillator signal plane 228 and unknown point P$_{LO-1}$. It is noted that although the location of P$_{LO-1}$, may be unknown, the radius R of local oscillator signal plane 228 can be determined based on the locations of any of cardinal points (I$_{Bias}$+OffsetA, Q$_{Bias}$), (I$_{Bias}$, Q$_{Bias}$+OffsetA), (I$_{Bias}$−OffsetA, Q$_{Bias}$) and (I$_{Bias}$−OffsetA, Q$_{Bias}$) obtained in response to application of first, second, third, or fourth (positive or negative) offset signal voltages generated by offset signal generator 230 during a process to iteratively determine the contribution of characteristic bias voltage is 157 and 158 to unmodulated local oscillator signal component 192. It is also noted that the ratio (Lowest$_{level}$)/(2*R(DC$_{level}$)) of expression (2) is within the domain of −1 to +1. Accordingly, use of expression (2) can operate to validate an initial estimate of the quadrant of P$_1$.

FIG. 4 shows angle α1 as an angle in a right triangle having an opposite side length given by R*Sin(α1) and an adjacent side length given by R*Cos(α1). It is noted that the adjacent side length (i.e., R*Cos(α1)) represents a position in the horizontal (in-phase) axis of local oscillator signal plane 228 and that adjacent side length (i.e., R*Sin(α1)) represents a position in the vertical (quadrature-phase) axis of local oscillator signal plane 228. Thus, in the example of FIG. 4, lengths R*Cos(α1) and R*Sin(α1) can be utilized to inform programming of computer 220 as to the offset signal voltages that are to be applied to offset signal generator 230. The offset signal voltages can be determined via expressions (3) and (4), below:

$$Q_{offset1} = Q_{Bias} + R(\text{Offset})*\text{Sin}(\alpha 1) \quad (3)$$

$$I_{offset1} = I_{Bias} + R(\text{Offset})*\text{Cos}(\alpha 1) \quad (4)$$

where R(Offset) of expressions (3) and (4) represents Offset$_A$, shown in FIG. 4. Offset$_A$, as described above, represents a first positive offset signal voltage. Q$_{Bias}$ of expression (3) can represent an approximation of characteristic bias voltage 157 (i.e., quadrature-phase contribution to P$_1$). I$_{Bias}$ of expression (4) can represent an approximation of characteristic bias voltage 158 (i.e., quadrature-phase contribution to P$_1$).

It is noted that in the example of FIG. 4, an initial estimated location of point P$_{LO-1}$ is within quadrant D1 of local oscillator signal plane 228. Location of point P$_{LO-1}$ in quadrant D1 of local oscillator signal plane 228 can be validated by line segment 425 corresponding to the DC$_{level}$ of expression (2) so as to provide the quantity (Lowest$_{level}$)/(2*R(DC$_{level}$)) that is within domain of the arcsin function (i.e., −1 to +1). It should be noted, however, that in response to point P$_{LO-1}$ being positioned in quadrant of local oscillator signal plane 228 other than D1, DC$_{level}$ can be adjusted such as as in accordance with FIG. 4.

Figure 5:
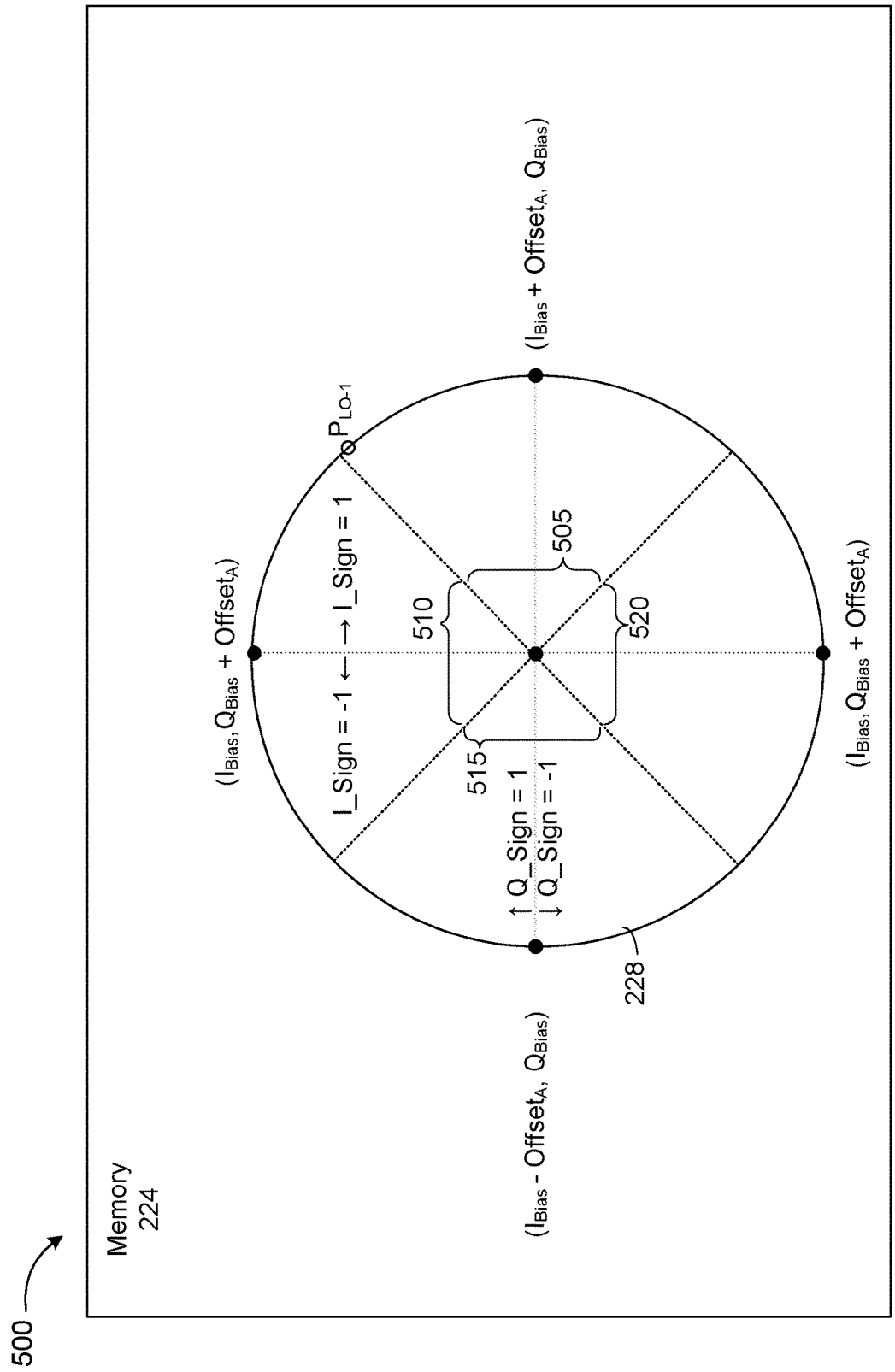
FIG. 5 is a diagram of points positioned in a local oscillator signal plane of a grid space of a computer memory to adjust for an outcome of a first iteration in a frequency modulator calibration process.

FIG. 5 is a diagram 500 of points positioned in a grid space of a computer memory to adjust for an outcome of a first iteration in a frequency modulator calibration process. As described in relation to the example of FIG. 4, the quantity Lowest$_{level}$ of expression (2) can be represented by line segment 425, in which line segment 425 extends from the point represented by (1, 0) of local oscillator signal plane 228 to point P$_1$. Since the location of point P$_1$ is unknown, an adjustment can be made to the Lowest$_{level}$ of expression (2) to account for the Lowest$_{level}$ being determined to be nearer to other cardinal points of local oscillator signal plane 228, such as the cardinal points represented by (I$_{Bias}$+OffsetA, Q$_{Bias}$), (I$_{Bias}$, Q$_{Bias}$+OffsetA), (I$_{Bias}$−OffsetA, Q$_{Bias}$) and (I$_{Bias}$−OffsetA, Q$_{Bias}$). For the example of FIG. 4, the estimated location of point P$_{LO-1}$ has been determined to be within subdivision 505 (shown in FIG. 5), in view of line segment 425 being of a lesser length than line segments 405, 410, and 420. In response to point P$_1$ being nearer to cardinal points represented by (I$_{Bias}$+OffsetA, Q$_{Bias}$), (I$_{Bias}$, Q$_{Bias}$+OffsetA), (I$_{Bias}$−OffsetA, Q$_{Bias}$) and (I$_{Bias}$−OffsetA, Q$_{Bias}$), of local oscillator signal plane 228 than the cardinal point represented by (I$_{Bias}$+OffsetA, Q$_{Bias}$), expressions (5)-(8), below, can be utilized to identify signal levels generated by offset signal generator 230 for all of the cardinal points identified in FIG. 4:

$$(1, 0): \text{Set}(I_{Bias} + \text{Offset}_A, Q_{Bias}) = DC\_Level\_I+ \quad (5)$$

$$(-1, 0): \text{Set}(I_{Bias} - \text{Offset}_A, Q_{Bias}) = DC\_Level\_I- \quad (6)$$

$$(0, 1): \text{Set}(I_{Bias}, Q_{Bias} + \text{Offset}_A) = DC\_Level\_Q+ \quad (7)$$

$$(0, -1): \text{Set}(I_{Bias}, Q_{Bias} - \text{Offset}_A) = DC\_Level\_Q- \quad (8)$$

In an example, an offset signal voltage (e.g., Offset$_A$) can be set to a value, such as 0.2 volts, 0.25 volts, 0.50 volts, etc.)

Utilizing expressions (5)-(8), the quantity DC$_{level}$ of expression (2) can be adjusted by further defining the signs (i.e., positive voltage or negative voltage) generated by offset signal generator 230 as in expressions (9)-(12) below:

$$I_{sign} = \text{Sign}(DC\_Level\_I+ - DC\_Level\_I-) \quad (9)$$

$$Q_{sign} = \text{Sign}(DC\_Level\_Q+ \_dBc - DC\_Level\_Q-) \quad (10)$$

$$\text{Offset\_Cos} = \text{Offset}*\text{Cos}(\alpha 1) \quad (11)$$

$$\text{Offset\_Sin} = \text{Offset}*\text{Sin}(\alpha 1) \quad (12)$$

where "Sign" of expressions (9) and (10) indicates the signum function, which results in a value of 1 for all positive values of the argument and results in a value of −1 for all negative values of the argument. Referring to FIG. 5, in response to Lowest$_{level}$ (of expression (2)) being nearer to the cardinal points represented by ($I_{Bias}$+OffsetA, $Q_{Bias}$) or ($I_{Bias}$−OffsetA, $Q_{Bias}$), which correspond to subdivision 505 and subdivision 515 of local oscillator signal plane 228, signals generated by offset signal generator 230 ($I_{offset1}$, $Q_{offset1}$) can be computed in accordance with expression (13) below:

$$(I_{Offset1}, Q_{Offset1}) = (I_{DC} + I_{sign} * \text{Offset\_Cos}, Q_{DC} + Q_{sign} * \text{Offset\_Sin}) \quad (13)$$

Also in reference to FIG. 5, in response to Lowest$_{level}$ (of expression (2)) being nearer to the cardinal points represented by (0, 1) or (0, −1), which can correspond to subdivision 510 and subdivision 520 of local oscillator signal plane 228, signals generated by offset signal generator 230 ($I_{offset1}$, $Q_{offset1}$) can be computed in accordance with expression (14) below:

$$(I_{Offset1}, Q_{Offset1}) = (I_{DC} + I_{sign} * \text{Offset\_Sin}, Q_{DC} + Q_{sign} * \text{Offset\_Cos}) \quad (14)$$

In accordance with FIG. 5, the effect of expressions (5)-(14) can be to instruct, via programming of computer 220, offset signal generator 230 to generate a positive voltage for coupling to mixer 154 in response to Lowest$_{level}$ (of expression (2)) being positioned at the right-hand portion of local oscillator signal plane 228 and to generate a positive voltage for coupling to mixer 154 in response to Lowest$_{level}$ being located at the left-hand portion of local oscillator signal plane 228. As is also shown in FIG. 5, an effect of expressions (5)-(14) is to instruct, via programming of computer 220, offset signal generator 230 to generate a positive voltage for coupling to mixer 153 in response to Lowest$_{level}$ being positioned at the top half of local oscillator signal plane 228 and to generate a negative voltage for coupling to mixer 153 in response to Lowest$_{level}$ being located at the bottom half of local oscillator signal plane 228.

Figure 6:
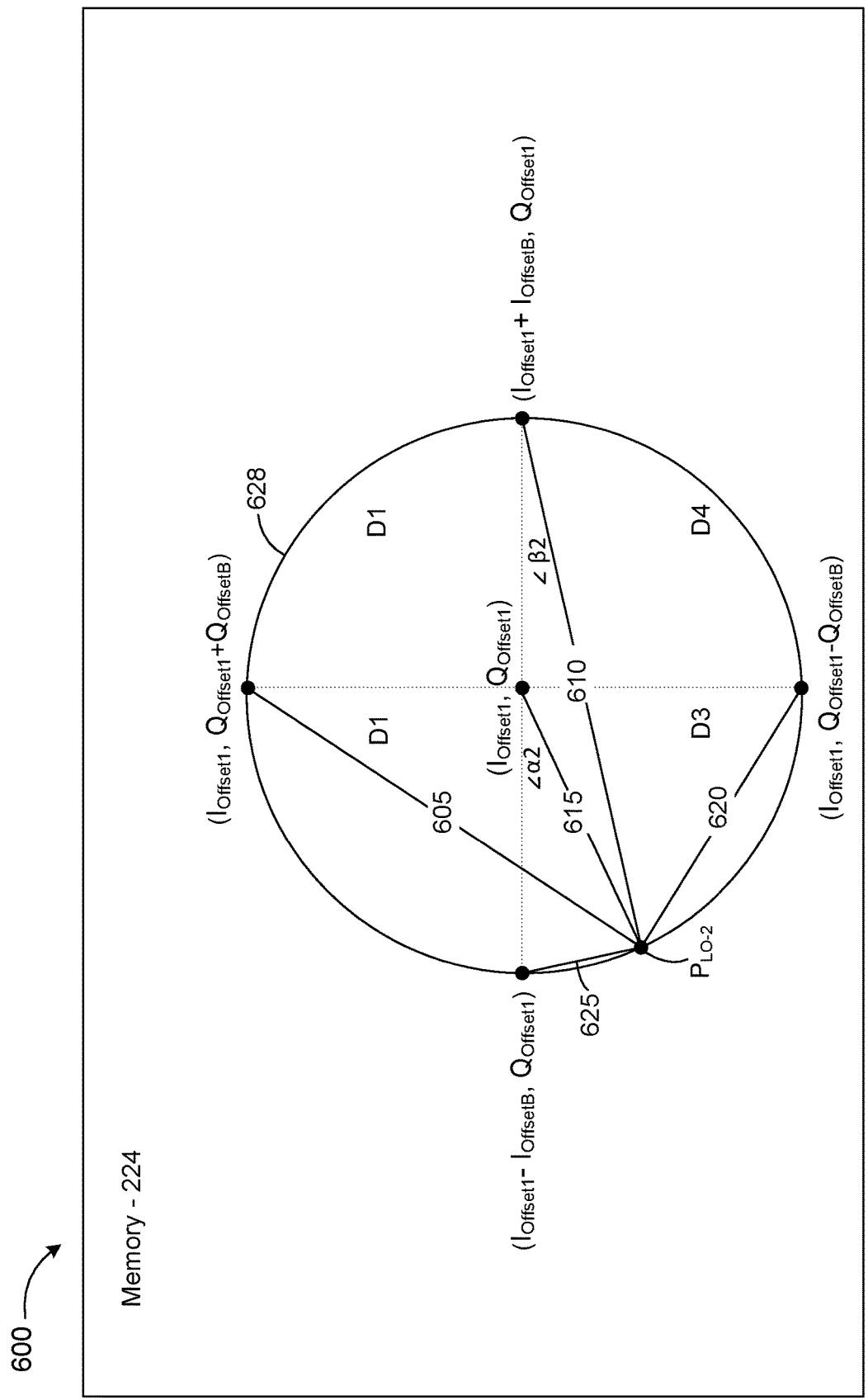
FIG. 6 is a diagram of points positioned in a grid space during a second iteration of a process to calibrate an in-phase and a quadrature-phase modulator.

FIG. 6 is a diagram 600 of points positioned in a grid space during a second iteration of a process to calibrate an in-phase and quadrature-phase modulator. As shown in FIG. 6, local oscillator signal plane 628 includes reference point at $I_{offset1}$, $Q_{offset1}$, which is determined via either expression (13) or expression (14), described in reference to FIG. 5. In the example of FIG. 5, the reference point at $I_{Offset1}$, $Q_{offset1}$, represents an estimate of the location of point $P_{LO-1}$ positioned on local oscillator signal plane 228 of FIGS. 2-3B. Accordingly, local oscillator signal plane 628 can represent a second local oscillator signal plane, which may be used to increase or refine an estimate of the location of point $P_{LO-1}$. In an example, local oscillator signal plane 628 includes a radius (e.g., 615) that is smaller (e.g., according to an outcome of a selected approximation technique) than the radius (e.g., line segment 415) of local oscillator signal plane 228.

The cardinal points ($I_{Bias}$+OffsetA, $Q_{Bias}$), ($I_{Bias}$, $Q_{Bias}$+OffsetA), ($I_{Bias}$−OffsetA, $Q_{Bias}$) and ($I_{Bias}$−OffsetA, $Q_{Bias}$) of local oscillator signal plane 628 can be updated, based on an approximation technique to refine an estimate of point $P_{LO-1}$, which may be represented as point $P_{LO-2}$ on local oscillator signal plane 628. Accordingly, cardinal point ($I_{Offset1}$+$I_{OffsetB}$, $Q_{Offset1}$) of FIG. 6 can represent a fifth unmodulated local oscillator signal level based on offset signal generator 230 generating a fifth voltage of $I_{Offset1}$+$I_{OffsetB}$ applied to mixer 154 and based on a voltage of $Q_{Offset1}$ applied to mixer 153. Cardinal point ($I_{offset1}$, $Q_{Offset1}$+$Q_{OffsetB}$) can represent a sixth unmodulated local oscillator signal level based on offset signal generator 230 generating a voltage of $I_{Offset1}$, applied to mixer 154 and based on an offset signal voltage of $Q_{Offset1}$+$Q_{OffsetB}$ applied to mixer 153. Cardinal point ($I_{Offset1}$−$I_{OffsetB}$, $Q_{Offset1}$) can represent a seventh unmodulated local oscillator signal level based on offset signal generator 230 generating a voltage of $I_{offset1}$−$I_{offsetB}$ and based on a voltage of $Q_{offset1}$ applied to mixer 153. Cardinal point ($I_{offset1}$, $Q_{offset1}$−$Q_{offsetB}$) can represent an eighth unmodulated local oscillator signal level based on offset signal generator 230 generating a voltage of $I_{offset1}$ applied to mixer 154 and based on a voltage of $Q_{offset1}$−$Q_{offsetB}$. Accordingly, in the example of FIG. 6, programming of computer 220 executes to position cardinal points on local oscillator signal plane 628 based on offset signals generated by offset signal generator 230. During a second iteration, utilizing local oscillator signal plane 628, and offset signal voltage (e.g., Offset$_B$) can be smaller than an offset signal voltage utilized during a first iteration in accordance with a selected approximation technique (e.g., Offset$_B$=(Offset$_A$)/2, Offset$_B$=(Offset$_A$)/4, Offset$_B$=(Offset$_A$)/10, etc.).

The process of estimating the location of point $_{LO-2}$, which can represent an updated estimate of point $P_{LO-1}$, may continue with determining the value for $\angle\beta2$ shown in FIG. 6, substituting $\alpha1$ with $\alpha2$ and substituting $\beta1$ with $\beta2$ in expressions (1) and (2). Accordingly, computing a second offset signal applied by offset signal generator 230 can involve determining a second angle ($\alpha2$) between a line segment from ($I_{Offset1}$, $Q_{Offset1}$) to ($I_{Offset1}$−$I_{OffsetB}$, $Q_{Offset1}$) and a line segment between ($I_{Offset1}$, $Q_{Offset1}$) and point $P_{LO-2}$.

In reference to expression (2) the quantity Lowest$_{level}$ represents the local oscillator signal plane distance (utilizing local oscillator signal plane 628) between a cardinal point (e.g., ($I_{Bias}$+OffsetA, $Q_{Bias}$), ($I_{Bias}$, $Q_{Bias}$+OffsetA), ($I_{Bias}$−OffsetA, $Q_{Bias}$) and ($I_{Bias}$−OffsetA, $Q_{Bias}$)) that provides the lowest level of unmodulated local oscillator signal component (e.g., 192) relative to SSB signal component 195 as determined via programming of computer 220. In the example of FIG. 6, the quantity Lowest$_{level}$ of expression (2) can be represented by line segment 625, which is lesser in length than line segments 605, 610, and 620. The quantity 2*R(DC$_{level}$) of expression (2), during the second iteration, can represent twice the length of the radius of local oscillator signal plane 628. In the example of FIG. 6, R is represented by line segment 615, which includes a length from the reference point ($I_{Offset1}$, $Q_{Offset2}$) of local oscillator signal plane 628 and unknown point $P_{LO-2}$.

In the example of FIG. 4, lengths R*Cos($\alpha2$) and R*Sin ($\alpha2$) can be utilized to inform programming of computer 220 as to the offset signal voltages that are to be applied to offset signal generator 230. The offset signal voltages can be determined via expressions (15) and (16), below:

$$Q_{Offset2} = Q_{Offset1} + R(\text{Offset1} - Q_{Bias}) * \text{Sin}(\alpha2) \quad (15)$$

$$I_{Offset2} = I_{Offset1} + R(\text{Offset} - I_{Bias}) * \text{Cos}(\alpha2) \quad (16)$$

where R(Offset) of expressions (15) and (16) are similar to expressions (3) and (4) with $\alpha2$ being substituted for $\alpha1$, I and Q offsets ($Q_{Bias}$, $I_{Bias}$) being substituted for ($Q_{offset1}$, $I_{offset1}$).

Expressions (5)-(8) can then be adapted as expressions (17)-(20) for use during the second iteration with respect to determining the location of point $P_2$, as follows:

$$(1, 0): \text{Set } (I_{Offset1} + \text{Offset}_B, Q_{Offset1}) = \text{DC\_Level\_I} + \quad (17)$$

$$(-1, 0): \text{Set } (I_{Offset1} + \text{Offset}_B, Q_{Offset1}) = \text{DC\_Level\_I} - \quad (18)$$

$$(0, 1): \text{Set } (I_{Offset1}, Q_{Offset1} + \text{Offset}_B) = \text{DC\_Level\_Q} + \quad (19)$$

$$(0, -1): \text{Set } (I_{Offset1}, Q_{Offset1} - \text{Offset}_B) = \text{DC\_Level\_Q} - \quad (20)$$

In an example, offset signal voltage (e.g., $\text{Offset}_B$) can be set to a value smaller than $\text{Offset}_A$, such as 0.05 volts, 0.10 volts, 0.15 volts, etc.) in accordance with a selected approximation technique.

Utilizing expressions (17)-(20), the quantity $DC_{level}$ of expression (2) can be adjusted by further defining the sense (i.e., positive voltage or negative voltage) of signals that can be generated by offset signal generator 230 as in expressions (21)-(24) below:

$$I_{sign} = \text{Sign}(\text{DC\_Level\_I} + -\text{DC\_Level\_I} -) \quad (21)$$

$$Q_{sign} = \text{Sign}(\text{DC\_Level\_Q} + \_\text{dBc} - \text{DC\_Level\_Q} -) \quad (22)$$

$$\text{Offset\_Cos} = (\text{Offset}_B - \text{Offset}_1) * \text{Cos}(\alpha 2) \quad (23)$$

$$\text{Offset\_Sin} = (\text{Offset}_B - \text{Offset}_1) * \text{Sin}(\alpha 2) \quad (24)$$

where expressions (21)-(24) are similar to expressions (9)-(12) with $\alpha 2$ of expressions (23) and (24) being substituted for $\alpha 1$ in expressions (11) and (12). In addition, $\text{Offset}_B$-$\text{Offset}_1$ of expressions (23)-(24) has been substituted for Offset of expressions (11) and (12). Accordingly, further refined values for offset signal voltages that can be applied by offset signal generator 230 follow in expressions (25)-(26):

$$(I_{Offset2}, Q_{Offset2}) = (I_{DC} + I_{sign} * \text{Offset\_Cos}, Q_{DC} + Q_{sign} * \text{Offset\_Sin}) \quad (25)$$

$$(I_{Offset2}, Q_{Offset2}) = (I_{DC} + I_{sign} * \text{Offset\_Sin}, Q_{DC} + Q_{sign} * \text{Offset\_Cos}) \quad (26)$$

Thus, as described in reference to FIG. 6, an iterative process can be utilized to estimate and refine values for bias voltages to be generated by offset signal generator 230, which compensates for characteristic bias voltages 157 and 158. By compensating for characteristic bias voltages 157 and 158, via an iterative process, unmodulated local oscillator signals generated by frequency modulator 150 can be reduced to a predetermined value. In some instances, a first iteration described in reference to expressions (1)-(14) can result in a power level ($P_{LO-1}$) of unmodulated local oscillator signal component 192 (of FIG. 2) that is between 20 and 40 decibels below the power level ($P_{I/Q}$) of I/Q spectrum representing I/Q spectrum component 194. A second iteration, described in reference to expressions (15)-(26), can reduce the power level of unmodulated local oscillator signal component 192 by an additional 15 to 25 decibels below ($P_{I/Q}$). In an example, a total of 4-6 iterations, $P_{LO}$ can be reduced to between 50 and 80 decibels below $P_{I/Q}$.

Figure 7:
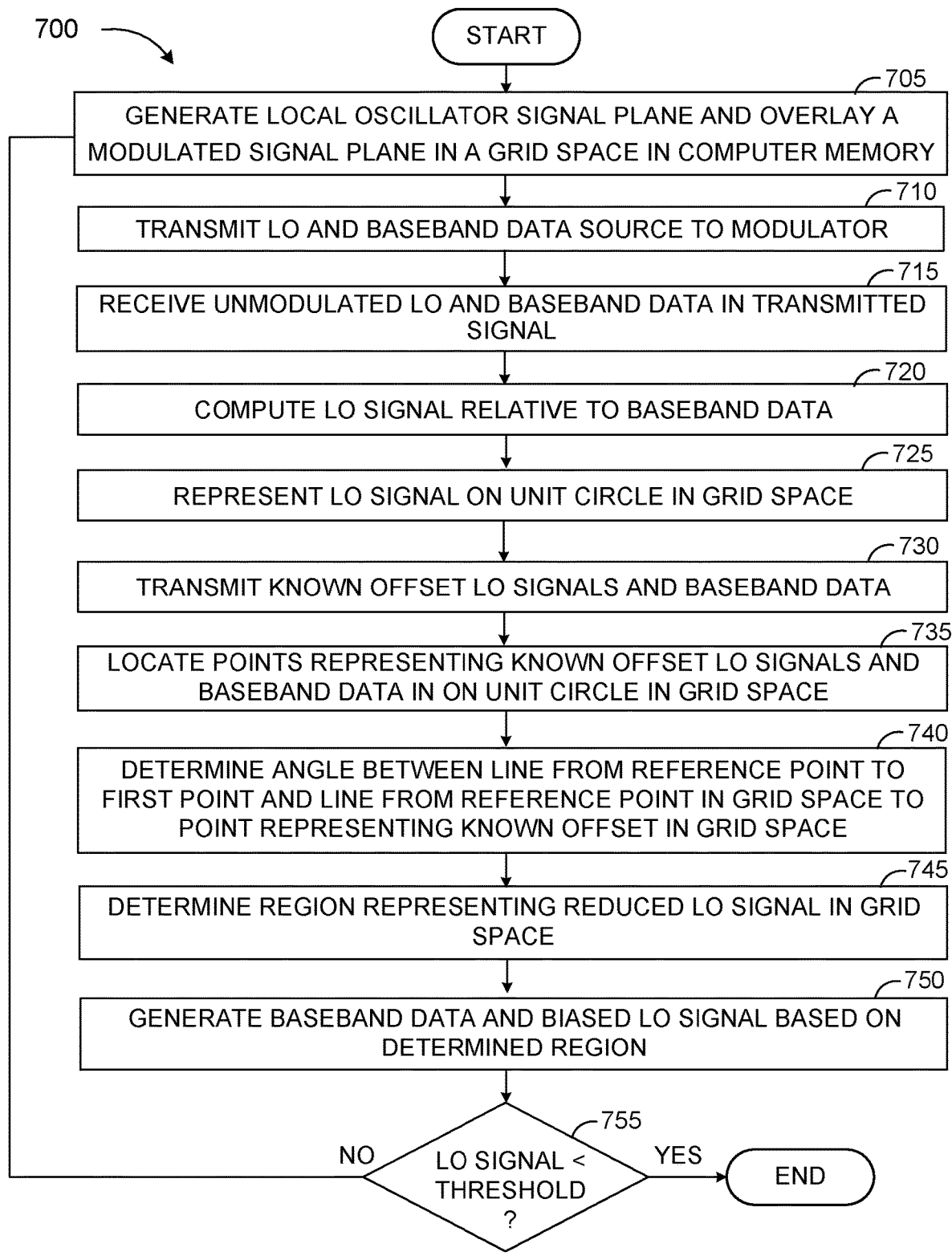
FIG. 7 is a flowchart for a process for in-phase and quadrature-phase modulator calibration.

FIG. 7 is a flow diagram for a process 700 for in-phase and quadrature-phase modulator calibration. Calibration of an in-phase and quadrature-phase frequency modulator (e.g., 150) can operate to reduce a power level of an unmodulated local oscillator signal component (e.g., 192) relative to the power level of a modulated I/Q spectrum component (e.g., 194). Calibration of an in-phase and quadrature-phase frequency modulator (e.g., 150) can operate to compensate for characteristic bias voltages (e.g., 157, 158) that allow an unmodulated signal from a local oscillator (e.g., 140) to be coupled directly from an input port of the frequency modulator (e.g., 150) to an output port to be received by a receiver, such as an orbiting satellite (e.g., 180). Calibration of such a frequency modulator (e.g., 150) can involve generating a grid space (e.g., 229) in a memory (e.g., 224) utilizing computer instructions executed via a computer (e.g., 220). In an example, a power level of an unmodulated local oscillator signal component (e.g., 192) can be represented as an unknown point (e.g., point $P_{LO-1}$) on a local oscillator signal plane (e.g., 228) in a grid space (e.g., 229). Offset signal voltages can then be coupled into a frequency modulator (e.g., 150) as part of an iterative process to refine an approximation of the location of the unknown point on the local oscillator signal plane. In response to determining an approximate position of the unknown point (e.g., point $P_{LO-1}$) local oscillator signal plane (e.g., 628) in the computer memory (e.g., 224). A reference point of the second local oscillator signal plane can be determined using the output signals from the offset signal generator, and a refined estimate of the location of the unknown point (e.g., $P_{LO-2}$) can be computed during a second iteration. The iterative process can continue until the offset signal generator (e.g., 230) generates, for example, bias voltages that compensate for characteristic bias voltages (e.g., 157, 158) of the frequency modulator (e.g., 150).

Process 700 begins at block 705, which includes computer 220 executing instructions to generate local oscillator signal plane 228 overlaid on modulated signal plane 239 within grid space 229 allocated in memory 224. A reference point of local oscillator signal plane 228 can represent unknown inherent characteristic bias voltages 157 and 158 (e.g., $Q_{Bias}$, $I_{Bias}$) that result from, for example, uncharacterized internal resistances and/or parasitic capacitances between electrical components, mismatches among internal radiofrequency components of quadrature-phase and in-phase frequency modulator 150.

Process 700 continues at block 710, which can include transmitting quadrature-phase modulated and in-phase modulated signals representing data from baseband source 105 that are summed by combiner 155 of frequency modulator 150 and output via output port 156. Block 710 can additionally include transmitting an unmodulated signal from local oscillator 140 that is directly coupled from an input port of frequency modulator 150 to output port 156.

Process 700 continues at block 715, which can include receiver 205 receiving an unmodulated local oscillator signal (e.g., as represented by unmodulated local oscillator signal component 192) and a modulated SSB signal component 195. Signals can be received by a spectrum analyzer, which represents signals received at orbiting satellite 180 or at another receiving station. A spectrum analyzer can include a display to depict an RF power versus frequency profile (profile 191). Profile 191 can indicate the received power of the unmodulated local oscillator signal component 192 in relation to the power level of modulated SSB signal component 195.

Process 700 continues at block 720, which can include programming of computer 220 executing to compute or determine a power level of unmodulated local oscillator signal component 192 in relation to the power level of modulated SSB signal component 195. Computing such relative power levels can be performed utilizing output data signals from a spectrum analyzer that includes receiver 205. In an example, a spectrum analyzer can generate output signals representing the power level of unmodulated local oscillator signal component 192 in relation to the power level of modulated SSB signal component 195.

Process 700 continues at block 725, which can include computer 220 executing instructions to represent local oscillator signal plane 228 in grid space 229. A reference point (e.g., an origin) of local oscillator signal plane 228 can correspond to characteristic bias voltages 157 and 158 as approximated by $Q_{Bias}$ and $I_{Bias}$ of local oscillator signal plane 228. Computer 220 can execute programming to scale line segment 415 of local oscillator signal plane 228 to represent the power level of unmodulated local oscillator signal component 192 (e.g., at unknown point $_{PLO-1}$) relative to the power level of SSB signal component 195.

Process 700 continues at block 730, which can include frequency modulator 150 transmitting unmodulated local oscillator signals in response to predetermined DC or other signals generated by offset signal generator 230. Signals from offset signal generator 230 can be coupled directly to quadrature-phase and in-phase signal input ports of frequency modulator 150 to be mixed with Q-data and I-data signals (120, 130) continuous-wave source 305.

Process 700 continues at block 735, which can include instructions executed by computer 220 locating the cardinal points of local oscillator signal plane 228 (e.g., ($I_{Bias}$+OffsetA, $Q_{Bias}$), ($I_{Bias}$, $Q_{Bias}$+OffsetA), ($I_{Bias}$−OffsetA, $Q_{Bias}$) and (IBias−OffsetA, QBias)). In response to locating cardinal points of local oscillator signal plane 228, programming of computer 220 can generate line segments (e.g., 405, 410, 420, and 425), which can be analyzed to determine the lowest level of unmodulated local oscillator signal component (e.g., 192) relative to SSB signal component 195.

Process 700 continues at block 740, which can include computer 220 executing instructions to compute angles α1 and β1 via expressions (1) and (2). In an example, computer 220 can execute instructions to determine an angle between a line segment from the reference point ($Q_{Bias}$, $I_{Bias}$) to unknown point $P_{LO-1}$ and in local oscillator signal plane 228 of grid space 229 to a cardinal point representing offset signal voltages (Offset$_A$) depicted in FIG. 4.

Process 700 continues at block 745, at which computer 220 can then execute instructions to compute expressions (3) and (4) to determine offset signal voltages ($Q_{offset1}$) and ($I_{offset1}$). Based on the shortest line segment from a cardinal point to unknown point P$_1$ (e.g., 425) which represents an estimated distance of a cardinal point to unknown point P$_1$, the sign (+/−) of the offset signal voltages can be determined utilizing expressions (5)-(12).

Process 700 continues at block 750, which can include generating baseband data from continuous-wave source 305 and local oscillator signals biased in accordance with a first offset signal voltages ($Q_{offset1}$) and ($I_{offset1}$) determined utilizing expressions (13) and (14).

Process 700 continues at block 755, which can include computer 220 determining whether a power level of unmodulated local oscillator signal component 192 meets a predetermined threshold value in relation to a power level of SSB signal component 195. In response to the power level of unmodulated local oscillator signal component 192 being below a predetermined threshold, such as 40 decibels, 50 decibels, 60 decibels, below the power level of SSB signal component 195, process 700 ends.

In response to block 755 indicating that the power level of unmodulated local oscillator signal component 192 is greater than a predetermined threshold (e.g., 40 decibels, 50 decibels, 60 decibels) below the power level of SSB signal component 195, process 700 can continue at block 705 by generating a second local oscillator signal plane (628) within grid space 229. At block 705, a second iteration can begin using suitable substitutions of expressions (1)-(14) as described in reference to expressions (15)-(26).

Computers or processors utilized by, for example, computer 220 may include one or more processors coupled to a memory. A computer memory can include one or more forms of computer readable media, and stores instructions executable by a processor for performing various operations, including as disclosed herein. For example, the computer can be a generic computer with a processor and memory as described above and/or a controller, or the like for a specific function or set of functions, and/or a dedicated electronic circuit including an ASIC that is manufactured for a particular operation, e.g., an ASIC for processing radio data. In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

As used herein, a computer memory can be of any suitable type, e.g., EEPROM, EPROM, ROM, Flash, hard disk drives, solid state drives, servers, or any volatile or non-volatile media. The memory can store data. The memory can be a separate device from the computer, and the computer can retrieve information stored in the memory. Alternatively, or additionally, the memory can be part of the computer, i.e., as a memory of the computer or firmware of a programmable chip.

While disclosed above with respect to certain implementations, various other implementations are possible without departing from the current disclosure.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc. should be read to recite one or more of the indicated elements unless a claim recites an explicit limitation to the contrary.

With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
a processor and a memory couplable to a receiver, the processor configured to execute instructions stored in the memory to:
position a first point in a grid space that represents an unmodulated signal component of a first signal based on a characteristic of a frequency modulator generating the first signal, the frequency modulator having a first input to receive data from a baseband source and having a second input to receive a second signal from a local oscillator;
apply a first offset signal to the frequency modulator;
determine, in the grid space, a first angle between a first line segment from a reference point to the first point and a second line segment from the first point to a point representing the first offset signal applied to the frequency modulator; and
apply a second offset signal, based on the first angle, to compensate for the characteristic of the frequency modulator.

2. The system of claim 1, wherein the characteristic of the frequency modulator represents a direct-current (DC) bias of the frequency modulator.

3. The system of claim 1, further comprising a quadrature-phase shifter coupled to a first output port of the local oscillator to convert a signal from the first output port to a quadrature-phase signal.

4. The system of claim 3, wherein the local oscillator includes a second in-phase output signal port.

5. The system of claim 1, wherein the instructions are additionally to generate a local oscillator signal plane overlaid on the grid space prior to locating the first point in the grid space, wherein the local oscillator signal plane includes a locus of points that represent possible values of in-phase and quadrature-phase contributions to the unmodulated signal component by the frequency modulator.

6. The system of claim 1, further comprising a first DC bias coupled to a quadrature-phase input port of the frequency modulator.

7. The system of claim 6, further comprising a second DC bias coupled to an in-phase input port of the frequency modulator.

8. The system of claim 1, wherein the baseband source includes a first baseband data source for in-phase modulation and a second baseband data source for quadrature-phase modulation.

9. The system of claim 1, wherein the instructions are additionally to determine a relationship between the unmodulated signal component and a second component representing the baseband source.

10. The system of claim 1, wherein the instructions are additionally to:
apply the second offset signal to the frequency modulator; and
determine a second angle between a third point representing the second offset signal applied to the frequency modulator and a fourth line segment from the third point to a fourth point representing a third offset signal applied to the frequency modulator.

11. A method, comprising:
modulating, via a frequency modulator, a first signal from a baseband source using a second signal from a local oscillator to form a third signal;
receiving the third signal and representing an unmodulated signal component of the third signal using a first point in a grid space generated in a computer memory, the unmodulated signal component being based on the second signal;
applying a first offset signal to the frequency modulator;
determining, in the grid space, a first angle between a first line segment from a reference point to the first point and a second line segment from the first point to a point representing the first offset signal applied to the frequency modulator; and
applying a second offset signal to the frequency modulator to reduce the unmodulated signal component based on the first angle.

12. The method of claim 11, wherein the first offset signal is a DC bias signal.

13. The method of claim 11, wherein modulating the first signal from the baseband source includes dividing the first signal into a first data stream for in-phase modulation and a second data stream for quadrature-phase modulation.

14. The method of claim 11, further comprising:
shifting a portion of the second signal into a quadrature-phase signal.

15. The method of claim 11, further comprising:
generating a local oscillator signal plane overlaid on the grid space prior to locating the first point in the grid space, wherein the local oscillator signal plane includes a locus of points that represent possible values of in-phase and quadrature-phase contributions to the unmodulated signal component by the frequency modulator.

16. The method of claim 11, further comprising determining a relationship between the unmodulated signal component and a second component representing the baseband source.

17. The method of claim 16, wherein determining the relationship between the unmodulated signal component and the second component comprises:
determining a ratio between a signal level of the unmodulated signal component and a signal level of the second component.

18. The method of claim 11, wherein the unmodulated signal component represents a DC bias applied to the frequency modulator.

19. The method of claim 11, further comprising:
determining a quadrant in the grid space, the quadrant being based on the second offset signal applied to the frequency modulator that reduces the unmodulated signal component.

20. The method of claim 11, further comprising:
responsive to applying the second offset signal to the local oscillator, determining a second angle between a line segment from a third point representing the second offset signal applied to the frequency modulator and a fourth line segment from the third point to a fourth point representing a third offset signal applied to the frequency modulator.

* * * * *